(12) United States Patent
Shin et al.

(10) Patent No.: US 7,566,427 B2
(45) Date of Patent: Jul. 28, 2009

(54) ANNULAR-TYPE DISTRIBUTOR WITH IMPROVED FLOW UNIFORMITY

(75) Inventors: Sang Baek Shin, Daejeon (KR); Sang Phil Han, Daejeon (KR); Ye Hoon Im, Daejeon (KR)

(73) Assignee: LG Chem, Ltd., Seoul (KR)

( * ) Notice: Subject to any disclaimer, the term of this patent is extended or adjusted under 35 U.S.C. 154(b) by 519 days.

(21) Appl. No.: 11/410,153

(22) Filed: Apr. 25, 2006

(65) Prior Publication Data
US 2006/0257301 A1 Nov. 16, 2006

(30) Foreign Application Priority Data
Apr. 29, 2005 (KR) .................. 10-2005-0035889

(51) Int. Cl.
*B01J 10/00* (2006.01)
*B01J 8/00* (2006.01)
*B01J 19/00* (2006.01)
*F28D 7/00* (2006.01)

(52) U.S. Cl. .................. 422/197; 422/201; 422/202; 422/188

(58) Field of Classification Search .................. 422/197, 422/201, 202, 188
See application file for complete search history.

(56) References Cited

U.S. PATENT DOCUMENTS 3,871,445 A * 3/1975 Wanka el al. .......... 165/104.14
4,578,248 A 3/1986 Nagaoka
4,586,566 A 5/1986 Kern et al.
6,444,033 B1 9/2002 O'Mara et al.
6,756,023 B1 * 6/2004 Corr et al. .................. 422/198
6,808,689 B1 * 10/2004 Matsumoto et al. ......... 422/196
2007/0202022 A1 * 8/2007 Shin et al. .................. 422/201

FOREIGN PATENT DOCUMENTS

| JP | 59-102804 A | 6/1984 |
| KR | 10-0307710 B1 | 6/2001 |
| KR | 2001-0050267 A | 6/2001 |
| KR | 10-2002-0008871 | 2/2002 |
| KR | 10-2003-0004336 A | 1/2003 |
| KR | 10-2003-0022116 A | 3/2003 |

* cited by examiner

Primary Examiner—Walter D Griffin
Assistant Examiner—Natasha Young
(74) Attorney, Agent, or Firm—McKenna Long & Aldridge LLP

(57) ABSTRACT

Disclosed are an annular-type distributor having a multiple slit layer including at least two annular layers, which are stacked while being spaced by a predetermined distance and in which at least one slit is formed so as to receive or discharge fluid; a reactor or a heat exchanger having the annular-type distributor; and a method of producing unsaturated aldehyde or unsaturated acid from olefin by catalytic gas phase oxidation reaction using the reactor.

16 Claims, 4 Drawing Sheets

ANNULAR-TYPE DISTRIBUTOR WITH IMPROVED FLOW UNIFORMITY

This application claims the benefit of the filing date of Korean Patent Application No. 10-2005-0035889, filed on Apr. 29, 2005, in the Korean Intellectual Property Office, the disclosure of which is incorporated herein in its entirety by reference.

FIELD OF THE INVENTION

The present invention relates to an annular-type distributor capable of receiving or discharging fluid in at least two circumferential portions thereof with improved flow uniformity and/or a low fluid speed, and a reactor or a heat exchanger having the same.

BACKGROUND OF THE INVENTION

In general, a multi-tubular catalytic reactor in the form of a heat exchanger is one of reactors capable of effectively removing heat derived from chemical reaction. In the multi-tubular catalytic reactor, solid catalysts are filled in a plurality of reaction tubes and reaction gas is fed into the reaction tubes, thereby generating chemical reaction in order to obtain desired products. In addition, a heating medium is circulated through a reactor shell such that the chemical reaction can be optimized.

However, according to the above multi-tubular catalytic reactor, hot spots may locally occur at the reaction tubes, thereby degrading the quality of the catalyst. Accordingly, the life time of the catalyst may be shortened and the yield of a target product may be reduced. In order to solve the above problems, there have been suggested various methods for reducing the hot spots by effectively transferring heat to the reaction tubes installed in the reactor.

For instance, Korean Unexamined Patent Publication No. 2001-50267 discloses a multi-tubular reactor including a heating medium circulation device as well as donut-type baffle plates and disc-type baffle plates, which are provided in a shell, in which the speed of a heating medium is constantly maintained at a predetermined inner region of the reactor, thereby improving the heat transfer efficiency. In addition, in order to uniformly feed (or discharge) the heating medium, which is introduced (or discharged) through one duct, into (or from) the reactor in the circumferential direction of the reactor, openings, such as slits, are intermittently aligned along a circumferential portion of a slit layer of an annular-type distributor. Thus, the heating medium is uniformly fed (or discharged) into (or from) the reactor in the circumferential direction of the reactor through the annular-type distributor having the above structure, thereby reducing the hot spot temperature of the reaction tubes. In addition, in order to allow the heating medium to uniformly flow, the annular-type distributor has a plurality of opening arrays, in which the number and size of openings are adjustable.

SUMMARY OF THE INVENTION

However, inventors of the present invention have found that there are limitations to distribute the heating medium with improved flow uniformity if the heating medium is fed into the conventional annular-type distributor having one slit layer through one duct, even if the number and size of the opening arrays are adjusted. In addition, in order to reduce the flow rate at a predetermined region where fluid is locally concentrated, if the size of the openings formed at the predetermined area is reduced, the speed of the heating medium introduced into the reactor may increase, so the flow of the heating medium may be disturbed in the reactor, thereby degrading the heat transfer efficiency.

In order to solve the above problem occurring in the prior art, the present invention provides an annular-type distributor capable of receiving and discharging fluid in at least two circumferential portions thereof with improved flow uniformity and/or a low fluid speed, and a reactor or a heat exchanger having the same.

In order to accomplish the above object, the present invention provides an annular-type distributor having a multiple slit layer including at least two annular layers, which are stacked while being spaced by a predetermined distance and in which at least one slit is formed so as to receive or discharge fluid; a reactor or a heat exchanger having the annular-type distributor; and a method of producing unsaturated aldehyde or unsaturated acid from olefin by catalytic gas phase oxidation reaction using the reactor.

According to the preferred embodiment of the present invention, when a slit layer aligned at an outermost portion from a center point of the circumference formed by the multiple slit layer is referred to as a first slit layer and slit layers sequentially stacked radially inward of the first slit layer are referred to as a second slit layer, a third slit layer, . . . , and an $n^{th}$ slit layer (n is an integer equal to or above 2), respectively, heights of slits formed in the first slit layer are adjusted within a range of 100 to 1000 mm or 10 to 70% of a height H of the annular-type distributor.

Preferably, the height of the slits formed in the first slit layer is adjusted as follows:

when the fluid feeding duct or the fluid discharge duct is located at an angular position of 180° in the annular-type distributor, an angle of 0 to 180° is divided into x regions (x is an integer equal to or above 2) where the height of the slit is individually variable, and a region adjacent to an angle of 0° is referred to as a first region and regions sequentially located toward an angle of 180° are referred to as a second region, a third region, . . . , and an $x^{th}$ region, respectively, wherein the height of the slits is gradually increased from the first to $x-1^{st}$ regions while constantly maintaining the height in each region, and the height of the slits is gradually reduced in the $x^{th}$ region as it reaches the fluid feeding duct or the fluid discharge duct, and the height of the slits formed in the regions corresponding to the angle of 180 to 360° is aligned symmetrically to the height of the slits formed in the regions corresponding to the angle of 0 to 180°.

Preferably, the heights of slits formed in one of the second to $n^{th}$ slit layers are adjusted within a range of 100 to 1000 mm or 10 to 70% of the height H of the annular-type distributor. At this time, one of the second to $n^{th}$ slit layers is preferably formed with slits having heights identical to the highest height of the slit formed in the first slit layer.

The annular-type distributor according to the present invention is advantageous when uniformly feeding or discharging fluid at a low fluid speed.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENTS

Hereinafter, the present invention will be described in detail.

In the following description, the term "slit layer" refers to an annular layer having at least one opening, that is, at least one slit for receiving or discharging fluid. Herein, the annular layer may include a partial annular layer, that is, an arc-shaped layer. In general, a slit layer having the slit is formed at an inner circumferential surface of an annular-type distributor.

In addition, the term "single slit layer" refers to one slit layer.

Also, the term "multiple slit layer" refers to at least two slit layers.

The annular-type distributor of the present invention is adaptable for feeding or discharging fluid, such as a heating medium, into or from a cylindrical catalytic reactor or a cylindrical heat exchanger. In particular, the annular-type distributor of the present invention is adaptable for a shell-and-tube type multi-tubular reactor or heat exchanger, which can be used for catalytic gas phase oxidation.

Accordingly, an example of the catalytic gas phase oxidation performed by the reactor or the heat exchanger having the annular-type distributor formed with a multiple slit layer is a process for forming unsaturated aldehyde or unsaturated acid from olefin. For instance, but not exclusively, this process may include a process for forming acroleine and/or acrylic acid by oxidizing propylene or propane, a process for forming methacroleine and/or methacrylic acid by oxidizing isobutylene, t-butyl alcohol, or methyl-t-butylether, a process for forming phthalic anhydride by oxidizing naphthalene or ortho-xylene, or a process for forming maleic anhydride by partially oxidizing benzene, butylene or butadiene.

If the annular-type distributor of the present invention is applied to a cylindrical reactor, the annular-type distributor can be used regardless of the kind of final products, such as (meth)acroleine or (meth)acrylic acid, which are produced by using the reactor.

Although the following description will be focused on the annular-type distributor applied to the multi-tubular catalytic reactor, the present invention is not limited thereto.

In the following description, the heating medium is used as an example of fluid. The heating medium may include, but not exclusively, fluid having high viscosity, such as molten salt. Molten salt mainly consists of potassium nitrate and sodium nitrite. In addition, the heating medium may include a phenyl ether medium (for example, "Dowtherm"), a polyphenyl medium (for example, "Therm S"), hot oil, naphthalene derivatives (for example, S.K. oil), or mercury.

Figure 1:
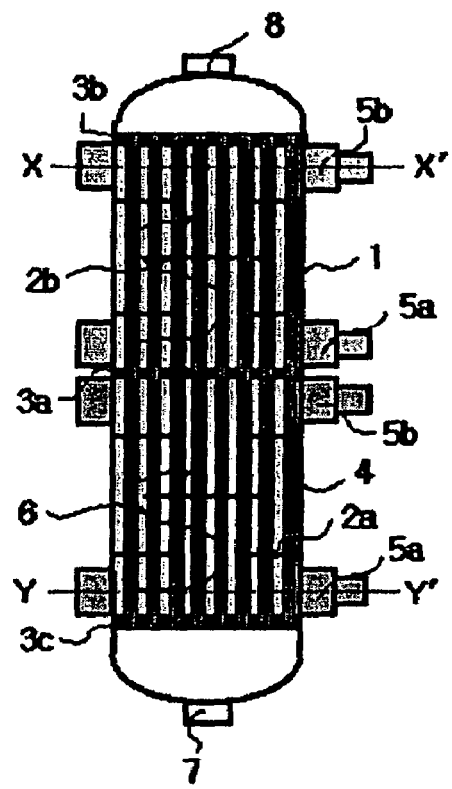
FIG. 1 is a sectional view illustrating a typical multi-tubular catalytic reactor or a heat exchanger.

FIG. 1 is a sectional view illustrating a conventional multi-tubular catalytic reactor or a heat exchanger. As shown in FIG. 1, if the multi-tubular catalytic reactor has a cylindrical structure, the annular-type distributor according to the present invention can be used regardless of the kind of reaction gas fed into the reactor or the heating medium. In addition, the annular-type distributor according to the present invention is applicable for a typical heat exchanger, which does not generate chemical reaction.

Referring to FIG. 1, the multi-tubular catalytic reactor includes a cylindrical shell 1 in which a plurality of tube sheets 3a, 3b and 3c and a plurality of reaction tubes 4 fixed to the tube sheets 3a, 3b and 3c are provided. The tube sheet 3a is positioned at the center of the reactor in order to divide the shell into two sub-shells while independently adjusting the reaction temperature using the heating medium. Each sub-shell includes a first annular-type distributor 5a connected to a heating medium feeding duct and a second annular-type distributor 5b connected to a heating medium discharge duct. Although FIG. 1 illustrates the reactor having four annular-type distributors, the present invention does not limit the number of annular-type distributors. A heating medium 6 is fed into the reactor through the annular-type distributors and flows along a fluid path defined by a donut-type baffle plate 2a and a disc-type baffle plate 2b while making heat-exchange with the reaction tubes 4. The reaction gas is fed through a reaction gas feeding duct 7 and is discharged through a reaction gas discharge duct 8 by passing through reaction tubes 4.

Figure 2:
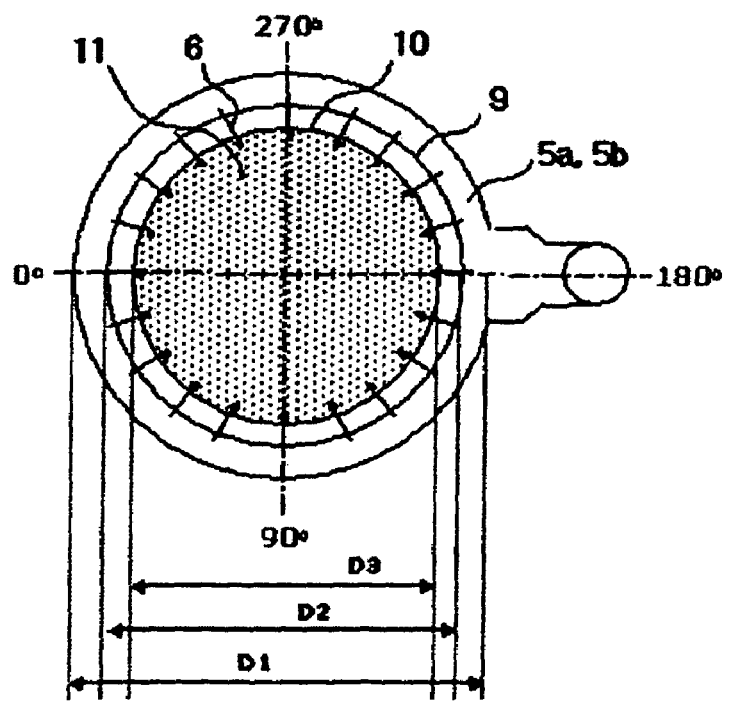
FIG. 2 is a sectional view taken along line X-X' or Y-Y' shown in FIG. 1 for illustrating an annular-type distributor having a multiple slit layer structure according to one embodiment of the present invention.

FIG. 2 is a sectional view taken along line X-X' or Y-Y' shown in FIG. 1 for illustrating the annular-type distributor having a multiple slit layer, which includes at least two annular layers, which are stacked while being spaced by a predetermined distance and in which at least one slit is formed for receiving or discharging fluid, according to one embodiment of the present invention.

The annular-type distributor according to the present invention is connected to the heating medium feeding duct or the medium discharge duct.

The multiple slit layer includes at least two annular slit layers, which are stacked while being spaced from each other by a predetermined distance. A slit layer aligned at an outermost portion from a center point of the circumference formed by the multiple slit layer is referred to as a first slit layer and slit layers sequentially stacked radially inward of the first slit layer are referred to as a second slit layer, a third slit layer, . . ., and an $n^{th}$ slit layer, respectively, (wherein, n is an integer equal to or above 2). Herein, the first slit layer is located in the first place to receive fluid fed from the fluid feeding duct, and the $n^{th}$ slit layer is located in the innermost place of the multiple slit layer.

In order to simplify explanation, it is assumed that the multiple slit layer includes two slit layers consisting of an outer slit layer 9 and an inner slit layer 10. Herein, the outer slit layer 9 corresponds to the first slit layer.

Referring to FIG. 2, the heating medium fed into the heating medium feeding duct passes through the multiple slit layer provided in the annular-type distributor 5a and is introduced into an inner portion 11 of the reactor. As mentioned above, the multiple slit layer consists of the outer slit layer 9 and the inner slit layer 10, in which the heating medium sequentially passes through the outer slit layer 9 and the inner slit layer 10.

The heating medium, which has passed through the inner slit layer 10, directly makes contact with the reaction tube provided in the reactor. Then, the heating medium, which makes contact with the reaction tube while flowing through a fluid path defined by the baffle plates, passes through the annular-type distributor having the multiple slit layer before it is discharged to the heating medium discharge duct, so that the heating medium can be discharged in the circumferential direction of the annular-type distributor with improved flow uniformity.

Preferably, a difference (D1–D2) between an outer diameter D1 of the annular-type distributor and a diameter D2 of the outer slit layer and a difference (D2–D3) between the diameter D2 of the outer slit layer and a diameter D3 of the inner slit layer are in a range of 200 to 700 mm or within a range of 5 to 15% of a diameter of the reactor (which is identical to the diameter D3 of the inner slit layer. If the diameter difference (D1–D2 or D2–D3) is less than 200 mm or 5% of the diameter D3, or larger than 700 mm or 15% of the diameter D3, the function of the annular-type distributor having the multiple slit layer structure is significantly degraded, thereby causing a difficulty to uniformly feed or discharge the heating medium into or from the reactor.

According to the present invention, several slit layers can be provided between the outer slit layer 9 and the inner slit layer 10 shown in FIG. 2. In this case, it is preferred if the slit layers provided between the outer slit layer 9 and the inner slit layer 10 are concentrically aligned between the outermost slit layer (the first slit layer) and the innermost slit layer (the $n^{th}$ slit layer) which are determined according to the diameter difference as mentioned above. More preferably, the slit layers are provided between the outer slit layer 9 and the inner slit layer 10 with equidistance.

Figure 3:
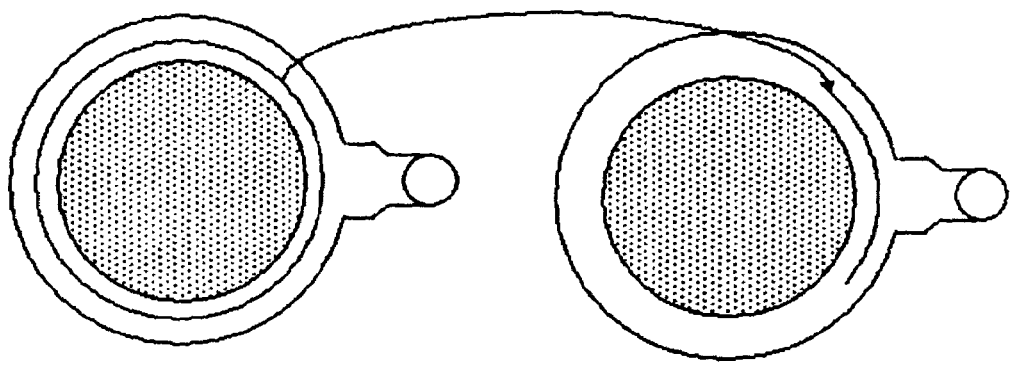
FIG. 3 is a sectional view illustrating an annular-type distributor having a multiple slit layer structure according to another embodiment of the present invention.

In addition, the slit layers (first to $n-1^{st}$ slit layers) except for the innermost slit layer (the $n^{th}$ slit layer) can be formed in a partial annular shape, that is, an arc shape having a predetermined angle (see, FIG. 3).

Preferably, the structure of the slit layers positioned between the outer slit layer 9 and the inner slit layer 10, that is, the slit distribution or slit size is identical to or proportionally identical to that of the innermost slit layer 10.

The present invention does not limit the shape of the slits. For instance, but not exclusively, the slits may have rectangular, circular, egg, or oval shapes.

Hereinafter, the position and size of the slits for receiving/discharging the heating medium will be described with reference to FIG. 4.

Figure 4:
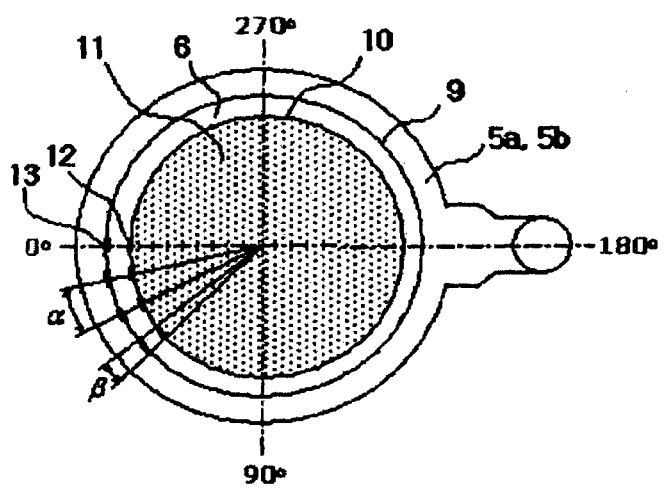
FIG. 4 is a sectional view illustrating positions and widths of slits formed in an annular-type distributor according to one embodiment of the present invention.

As shown in FIG. 4, the positions of the slits formed on the same slit layer are determined such that an angle of arc ($\alpha$) formed by two adjacent slits on the basis of the center point of the circumference formed by the slit layer is in a range of 4 to 8°. In addition, the width of each slit is determined such that an angle of arc ($\beta$) formed by both ends of the slit on the basis of the center point of the circumference formed by the slit layer is in a range of 1 to 3°.

If the angle of arc ($\alpha$) is less than 4°, the number of slits is unnecessarily increased, so it is very difficult to fabricate the slit layer while causing a structural problem. In addition, if the angle of arc ($\alpha$) is larger than 8°, the number of slits is significantly reduced, so it may not match with the intention of uniformly feeding the heating medium into the reactor in the circumferential direction using the annular-type distributor.

The angle of arc ($\alpha$) for determining the position of the slits and the angle of arc ($\beta$) for determining the width of the slits respectively may have one predetermined value selected from the above range such that the slits can be positioned in the same angular positions, however, some slits may have different widths for the purpose of flow uniformity. That is, although the slits are distributed with the same angle of arc ($\alpha$), some slits positioned in a region where the heating medium is introduced or discharged may have widths different from those of other slits.

For instance, if a fluid feeding duct or a fluid discharge duct is located at an angular position of 180° in the annular-type distributor, the angle of 0 to 180° is divided into x regions (wherein, x is an integer equal to or above 2). In this state, a region adjacent to an angle of 0° is referred to as a first region and regions sequentially located toward an angle of 180° are referred to as a second region, a third region, . . . , and an $x^{th}$ region, respectively. In the $x^{th}$ region, the flow pattern may significantly vary depending on the flow rate of fluid, so the widths of one or two slits are adjusted such that they form the angle of arc in a range of $\beta$ to $2\beta$, thereby uniformly distributing the fluid.

According to the conventional annular-type distributor having a single slit layer, the slits can be formed in at least two rows for the purpose of flow uniformity. However, the present invention includes at least two slit layers, so it is not necessary to form a plurality of slit rows. Hereinafter, the size of the slits in the outer slit layer will be described in detail with reference to FIG. 5.

Preferably, the height A1 of the slit formed in the outer slit layer is in a range of 100 to 1000 mm or 10 to 70% of the height H of the annular-type distributor.

Figure 5:
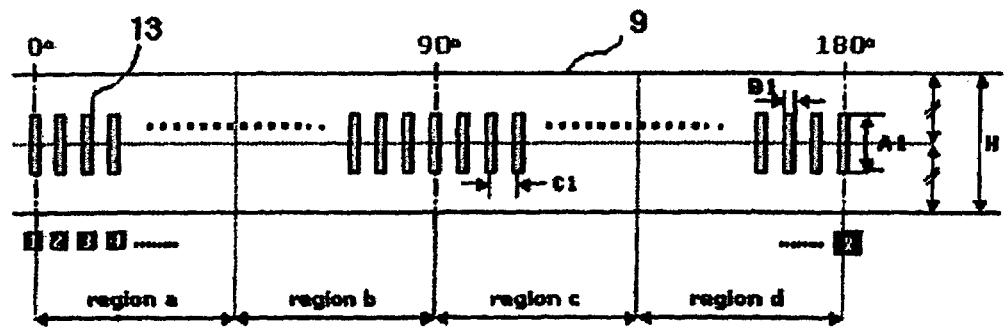
FIG. 5 is a development view of an outer slit layer for illustrating sizes and distribution of slits formed in an annular-type distributor according to one embodiment of the present invention.

Although FIG. 5 shows the slits with the same height, this is illustrative purpose only. It is preferred to adjust the height of the slits by dividing the angle of 0 to 180° into at least two regions.

If a heating medium feeding/discharge duct is located at an angular position of 180° in the annular-type distributor as shown in FIG. 4, the slits formed in the regions corresponding to the angle of 180 to 360° are preferably aligned symmetrically to the slits formed in the regions corresponding to the angle of 0 to 180°. Such a symmetrical alignment may vary depending on the position or number of the heating medium feeding/discharge duct. However, the present invention is not limited to the position or number of the heating medium feeding/discharge duct.

It is also possible to vary the height of the slit by dividing the angle of 0 to 180° into predetermined regions according to the position of the heating medium feeding/discharge duct. For instance, if the heating medium feeding/discharge duct is located at an angular position of 180° in the annular-type distributor, the angle of 0 to 180° can be divided into three regions corresponding to angles of 0 to 45°, 45 to 135°, and 135 to 180° so as to vary the height of the slit. At this time, the regions corresponding to an angle of 180 to 360° are formed symmetrically to the regions corresponding to an angle of 0 to 180°. As a result, the height of the slit may vary in every 90° along the circumference of the slit layer. If the angle of 0 to 180° is divided into four regions corresponding to angles of 0 to 30°, 30 to 90°, 90 to 150° and 150 to 180° so as to vary the height of the slit, the height of the slit may vary in every 60° along the circumference of the slit layer. In short, if the angle of 0 to 180° is divided into x regions where the height of the slit can be individually varied, the first and $x^{th}$ regions may correspond to angles of 0 to 180/2(x−1)° and 180−180/2(x−1)° to 180°, respectively. That is, the regions are formed in every 180/(x−1)° along the circumference of the slit layer.

However, according to the present invention, when the angle of 0 to 180° has been divided into x regions where the height of the slit can be individually varied, the regions are not needed to maintain a predetermined angle, but the angle can be changed.

Figure 7:
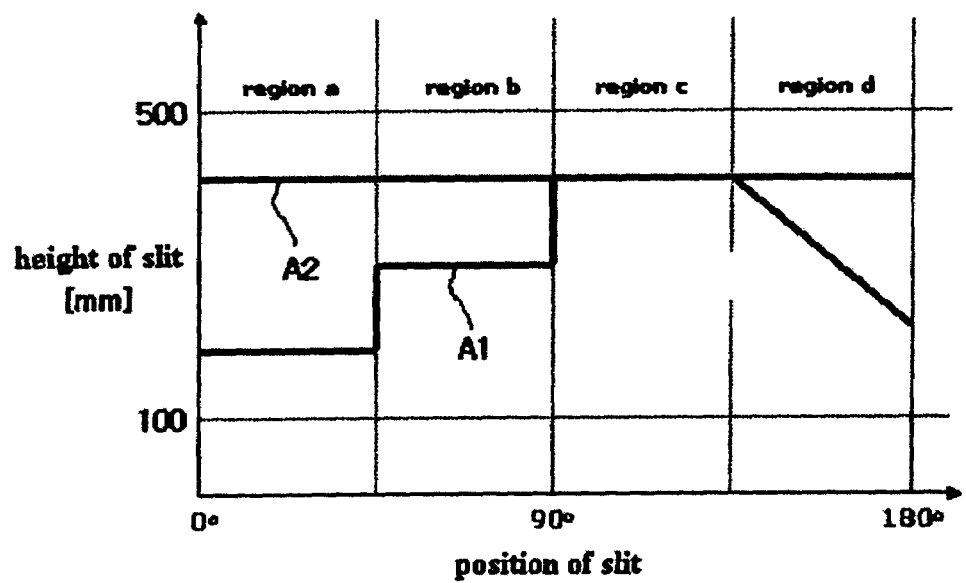
FIG. 7 is a graph illustrating heights of slits in inner and outer slit layers.

FIG. 7 is a graph illustrating the heights of the slits when the heating medium feeding/discharge duct is located at an angular position of 180° in the annular-type distributor and the angle of 0 to 180° is divided into four regions. Referring to FIG. 7, the height of the slit is gradually increased from a region a to a region c while constantly maintaining the height in each region. In addition, the height of the slit is gradually reduced in a region d as it reaches the heating medium feeding/discharge duct. The reason for adjusting the size of the slit in the above manner is that the fluid is concentrated in the region d where the heating medium feeding/discharge duct is located and the flow rate may significantly vary along the circumferential position thereof, so it is preferred to change the size of the slit. In addition, it is also preferred to gradually reduce the size of the slit as it becomes distant from the heating medium feeding/discharge duct in the remaining regions so as to prevent fluid concentration.

As mentioned above with reference to FIG. 4, because the width S1 of the slits formed in the outer slit layer (the first slit layer) can be adjusted by adjusting the angle of arc (β) in a range of 1 to 3°, the width of the slits is determined according to the diameter D2 of the slit layer. In the same manner, because the distance C1 between centers of two adjacent slits can be adjusted by adjusting the angle of arc (α) in a range of 4 to 8°, the distance between two adjacent slits is determined according to the diameter D2 of the slit layer.

Figure 6:
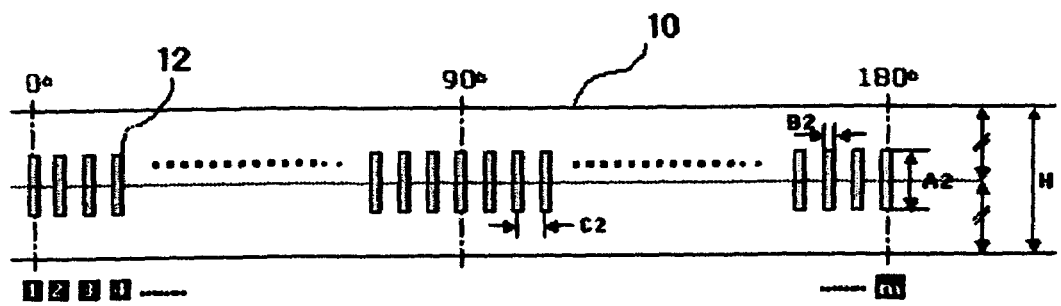
FIG. 6 is a development view of an inner slit layer for illustrating sizes and distribution of slits formed in an annular-type distributor according to one embodiment of the present invention.

Hereinafter, description will be made in detail with regard to the size of the slit formed inner slit layer with reference to FIG. 6.

Different from the height of the slits formed in the outer slit layer in which the height of the slits may vary depending on the regions, the height A2 of the slits formed in the inner slit layer is preferably identical to each other. That is, it is preferred that all slits formed in the inner slit layer have the same size.

Preferably, the height A2 of the slits is in a range of 100 to 1000 mm or 10 to 70% of the height H of the annular-type distributor. More preferably, the height A2 of the slits is in a range of 200 to 500 mm or 30 to 60% of the height H of the annular-type distributor.

As mentioned above with reference to FIG. 4, because the width 82 of the slits formed in the inner slit layer (the $n^{th}$ slit layer) can be adjusted by adjusting the angle of arc (β) in a range of 1 to 3°, the width of the slits is determined according to the diameter D3 of the slit layer. In the same manner, because the distance C2 between centers of two adjacent slits is adjusted by adjusting the angle of arc (α) in a range of 4 to 8°, the distance between two adjacent slits is determined according to the diameter D3 of the slit layer.

As described above, the slits formed in the inner slit layer have the same height A2. The heights A1 and A2 of the slits formed in the outer and inner slit layers are shown in FIG. 7. That is, preferably, the slits formed in the inner slit layer have the height A2 identical to the highest height of the slit formed in the outer slit layer. In this case, the slit formed in the inner slit layer has an area larger than that of the slit formed in the outer slit layer. Thus, the heating medium can be fed into the reactor with improved flow uniformity and a low fluid speed, so that the heating medium is not disturbed in the reactor, thereby obtaining uniform temperature distribution while preventing the hot spot.

Meanwhile, the annular-type distributor having the multiple slit layer can be fabricated, for instance through the processes of forming slit layers using iron plates, bending the slit layers in a cylindrical structure, and welding the cylindrical slit layers to the annular-type distributor.

EMBODIMENT

Hereinafter, an embodiment of the present invention will be described. However, this embodiment is illustrative purposes only, and may not intend to limit the scope of the present invention.

Embodiment 1

The annular-type distributor having the outer slit layer and the inner slit layer as shown in FIG. 4 was fabricated as follows:

Diameter of outer slit layer: 4550 mm
Diameter of inner slit layer: 4150 mm
Height of slit in inner slit layer: 300 mm
Width of slit in inner slit layer: 72.43 mm (β=2°)
Height of slit in outer slit layer: region a (100 mm), region b (150 mm), region c (200 mm), and region d (100-300 mm)
Width of slit in outer slit layer: 79.41 mm (β=2°)
Slit distribution in inner/outer slit layer: α=6°

Comparative Example 1

An annular-type distributor having one slit layer was fabricated as follows:

Diameter of slit layer: 4150 mm
Height of slit in slit layer: region a (100 mm), region b (150 mm), region c (200 mm), and region d (100-300 mm)
Width of slit in slit layer: 72.43 mm (β=2°)
Slit distribution in slit layer: α=6°

Result

Figure 8:
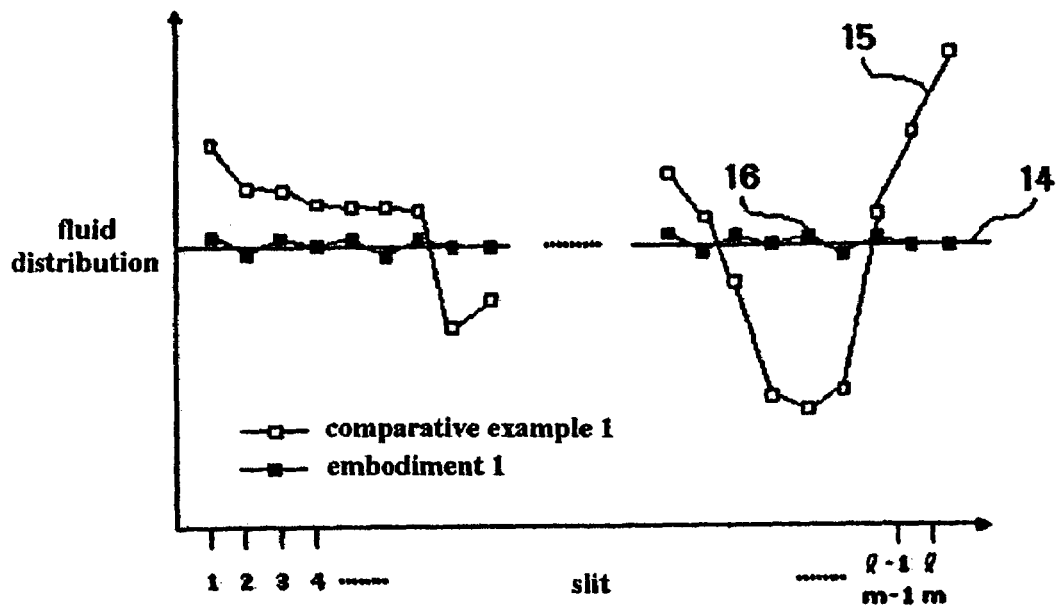
FIG. 8 is a graph illustrating fluid distribution obtained through slits formed in an innermost slit layer of an annular-type distributor having a multiple slit layer structure according to the present invention and fluid distribution obtained through slits formed in a conventional annular-type distributor having a single slit layer structure.

The annular-type distributor having one slit layer (comparative example 1) represents limitations to uniformly distribute the heating medium in the circumferential direction thereof. As shown in FIG. 8, the annular-type distributor having the slit structure according to comparative example 1 represents fluid distribution 15, which may not solve fluid concentration in the slits formed adjacent to the heating medium feeding/discharge duct.

However, the annular-type distributor having the multiple slit layer structure according to the present invention (embodiment 1) represents fluid distribution 16 similar to ideal fluid distribution 14.

Figure 9:
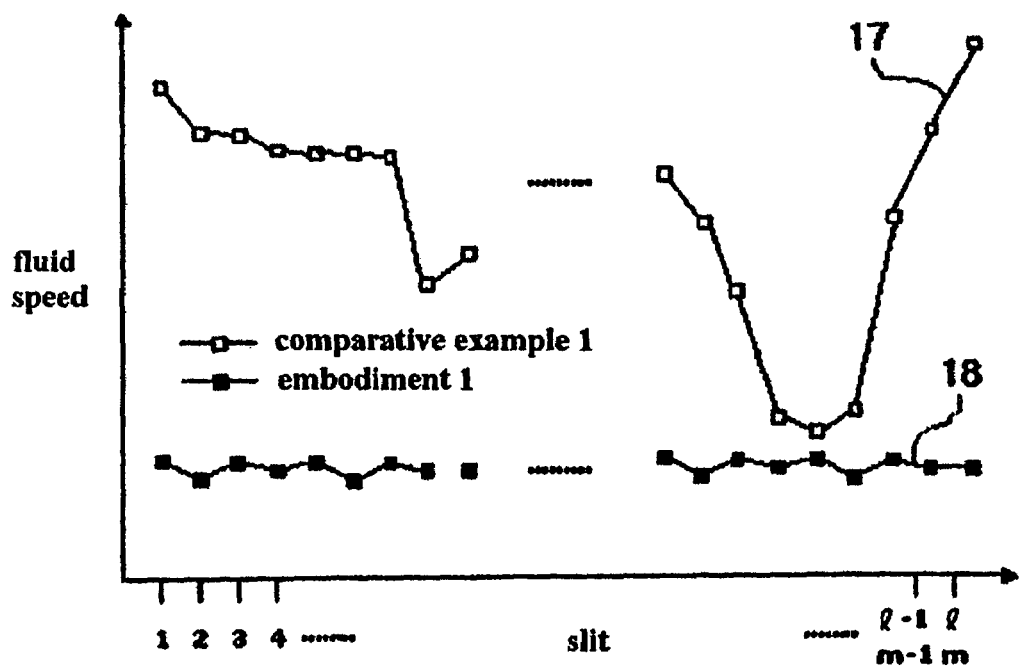
FIG. 9 is a graph illustrating fluid speed distribution obtained through slits formed in an innermost slit layer of an annular-type distributor having a multiple slit layer structure according to the present invention and fluid speed distribution obtained through slits formed in a conventional annular-type distributor having a single slit layer structure.

Therefore, as shown in FIG. 9, the annular-type distributor having the multiple slit layer according to the present invention can obtain uniform fluid speed distribution 18 as compared with fluid speed distribution 17 obtained from the conventional annular-type distributor having the single slit layer structure. This is possible because the annular-type distributor according to the present invention includes the multiple slit layer, where slits having the same size and relatively larger areas are distributed in the inner slit layer.

As described above, the annular-type distributor equipped with the multiple slit layer according to the present invention can receive/discharge fluid in at least two circumferential portions thereof with improved flow uniformity and/or a low fluid speed without causing great pressure decrease or increase, so the fluid is prevented from being disturbed in an apparatus (for example, a multi-tubular catalytic reactor or a heat exchanger), which receives or discharges fluid through the annular-type distributor, and the temperature distribution of the fluid in the apparatus can be uniformly maintained. Thus, it is possible to prevent the hot spot generated in the reactor.

Therefore, the reactor having the annular-type distributor according to the present invention can be stably operated when (meth)acroleine and/or (meth)acrylic acid is obtained from gas including propylene or isobutylene by catalytic gas phase oxidation. Thus, the yield of products can be improved at low energy and the life span of the catalyst can be expanded.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An annular-type distributor comprising:
a multiple slit layer including at least two annular layers, which are stacked while being spaced by a predetermined distance and in which at least one slit is formed so as to receive or discharge fluid,
wherein, when a slit layer aligned at an outermost portion from a center point of the multiple slit layer is referred to as a first slit layer and slit layers sequentially stacked radially inward of the first slit layer are referred to as a second slit layer, a third slit layer, ..., and an $n^{th}$ slit layer (n is an integer equal to or above 2), respectively, heights of slits formed in the first slit layer are adjusted within a range of 100 to 1000 mm or 10 to 70% of a height H of the annular-type distributor, and
the height of the slits formed in the first slit layer is adjusted as follows:
if the fluid feeding duct or the fluid discharge duct is located at an angular position of 180° in the annular-type distributor, an angle of 0 to 180° is divided into x regions (x is an integer equal to or above 2) where the height of the slit is individually variable and a region adjacent to an angle of 0° is referred to as a first region and regions sequentially located toward an angle of 180° are referred to as a second region, a third region, ..., and an $x^{th}$ region, respectively, wherein the height of the slits is gradually increased from the first to $x-1^{st}$ regions while constantly maintaining the height in each region, and the height of the slits is gradually reduced in the $x^{th}$ region as it reaches the fluid feeding duct or the fluid discharge duct, and
the height of the slits formed in the regions corresponding to the angle of 180 to 360° is symmetrically to the height of the slits formed in the regions corresponding to the angle of 0 to 180°.

2. The annular-type distributor as claimed in claim 1, wherein the multiple slit layer is formed at an inner circumferential surface of the annular-type distributor.

3. The annular-type distributor as claimed in claim 1, wherein the annular-type distributor is connected to at least one fluid feeding duct or a fluid discharge duct.

4. The annular-type distributor as claimed in claim 1, wherein, when a slit layer aligned at an outermost portion from a center point of the multiple slit layer is referred to as a first slit layer and slit layers sequentially stacked radially inward of the first slit layer are referred to as a second slit layer, a third slit layer, ..., and an nth slit layer (n is an integer equal to or above 2), respectively, one of the first to n–1st slit layers has an arc shape having a predetermined angle.

5. The annular-type distributor as claimed in claim 1, wherein, when a slit layer aligned at an outermost portion from a center point of the multiple slit layer is referred to as a first slit layer and slit layers sequentially stacked radially inward of the first slit layer are referred to as a second slit layer, a third slit layer, ..., and an $n^{th}$ slit layer (n is an integer equal to or above 2), respectively, a difference (D1–D2) between an outer diameter D1 of the annular-type distributor and a diameter D2 of the first slit layer and a difference (D2–D3) between the diameter D2 of the first slit layer and a diameter D3 of the nth slit layer are in a range of 200 to 700 mm or within a range of 5 to 15% of the diameter D3 of the $n^{th}$ slit layer.

6. The annular-type distributor as claimed in claim 5, wherein the second to n–1st slit layers are concentrically provided between the first slit layer and the nth slit layer.

7. The annular-type distributor as claimed in claim 1, wherein positions of the slits formed on a same slit layer are determined such that an angle of arc ($\alpha$) formed by two adjacent slits on a basis of the center point of the slit layer is in a range of 4 to 8°, and a width of each slit is determined such that an angle of arc ($\beta$) formed by both ends of the slit on a basis of the center point of the slit layer is in a range of 1 to 3°.

8. The annular-type distributor as claimed in claim 7, wherein, if the fluid feeding duct or the fluid discharge duct is located at an angular position of 180° in the annular-type distributor, an angle of 0 to 180° is divided into x regions (x is an integer equal to or above 2), in which a region adjacent to an angle of 0° is referred to as a first region and regions sequentially located toward an angle of 180° are referred to as a second region, a third region, ..., and an $x^{th}$ region, respectively, widths of one or two slits formed in the $x^{th}$ region are adjusted such that they form an angle of arc in a range of $\beta$ to $2\beta$.

9. The annular-type distributor as claimed in claim 1, wherein the height of the slits formed in the first slit layer is adjusted as follows:
if the fluid feeding duct or the fluid discharge duct is located at an angular position of 180° in the annular-type distributor, an angle of 0 to 180° is divided into a to d regions,
the height of the slits is gradually increased from the region a to the region c while constantly maintaining the height in each region, and the height of the slits is gradually reduced in the region d as it reaches the fluid feeding duct or the fluid discharge duct, and
the height of the slits formed in the regions corresponding to the angle of 180 to 360° is symmetrically to the height of the slits formed in the regions corresponding to the angle of 0 to 180°.

10. The annular-type distributor as claimed in claim 1, wherein, when a slit layer aligned at an outermost portion from a center point of the multiple slit layer is referred to as a first slit layer and slit layers sequentially stacked radially inward of the first slit layer are referred to as a second slit layer, a third slit layer, ..., and an $n^{th}$ slit layer (n is an integer equal to or above 2), respectively, heights of slits formed in one of the second to $n^{th}$ slit layers are adjusted within a range of 100 to 1000 mm or 10 to 70% of a height H of the annular-type distributor.

11. The annular-type distributor as claimed in claim 10, wherein, one of the second to $n^{th}$ slit layers is formed with slits having heights identical to each other.

12. The annular-type distributor as claimed in claim 11, wherein, one of the second to $n^{th}$ slit layers is formed with slits having heights identical to a highest height of the slit formed in the first slit layer.

13. The annular-type distributor as claimed in claim 1, wherein, when a slit layer aligned at an outermost portion from a center point of the multiple slit layer is referred to as a first slit layer and slit layers sequentially stacked radially inward of the first slit layer are referred to as a second slit layer, a third slit layer, ..., and an $n^{th}$ slit layer (n is an integer equal to or above 2), respectively, slit distribution or a height of slits formed in the second to $n^{th}$ slit layers is identical to or proportionally identical to each other.

14. A reactor or a heat exchanger comprising an annular-type distributor as claimed in claim 1.

15. The reactor or the heat exchanger as claimed in claim 14, wherein the multiple slit layer is formed at an inner circumferential surface of the annular-type distributor.

16. The reactor or the heat exchanger as claimed in claim 14, wherein the annular-type distributor is connected to at least one fluid feeding duct or a fluid discharge duct.

* * * * *